United States Patent Office 3,421,588
Patented Jan. 14, 1969

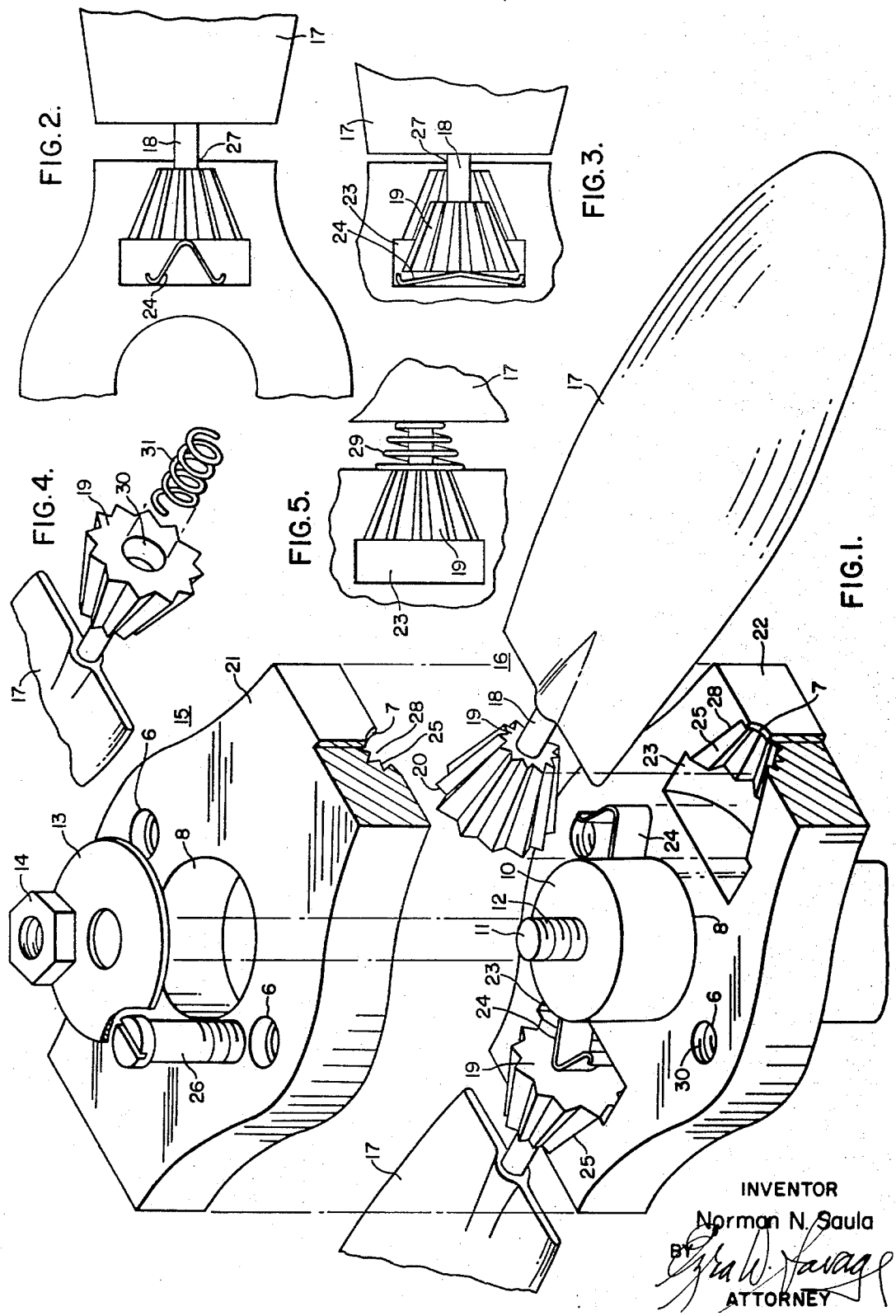

1

3,421,588
VARIABLE PITCH PROPELLERS FOR MOTOR
DRIVEN DEVICES
Norman N. Saula, 323 Kline Ave.,
Turtle Creek, Pa. 15145
Filed Oct. 5, 1967, Ser. No. 673,044
U.S. Cl. 170—160.59        3 Claims
Int. Cl. B63h 1/06; B63h 3/00; B64c 11/36

ABSTRACT OF THE DISCLOSURE

The propeller comprises a hub and a plurality of adjustable propeller blades. Each propeller blade comprises a boss the shape of a conic frustum having axially extending teeth and a shank between the boss and blade section. Housings provided in the hub are the reverse in shape to the bosses and have inwardly extending teeth which mesh with the teeth on the bosses. An opening leading from one end of each housing serves as a bearing for a shank and chambers at the opposite ends of the housings carry springs which hold the teeth in mesh. Since the bosses and housing are conical the teeth may be disengaged for pitch adjustment by moving the bosses radially a distance substantially equal to the depth of the teeth.

---

The invention relates generally to propellers for motor driven devices and more particularly to propellers for hobby aeroplanes.

An object of the invention is to provide a propeller for a motor driven device which has the blades so mounted that they may be set in different angular positions around the axis of the blade to change the pitch according to predetermined design to change the pulling power of the propeller when driven at predetermined speeds in some medium.

Another object of the invention is to provide a propeller blade that may be adjusted to different angular positions by giving the blade a small axial movement to release the locking means to permit the setting of the blade in any predetermined angular position to change the pitch of the blade and pulling power at predetermined speeds.

It is also an object of the invention to provide a propeller blade for hobby aeroplanes which may be released by a manually applied force to permit angular rotation to change the pitch and locked again by a small axial movement of the blade.

The invention accordingly is disclosed in the embodiments thereof shown in the accompanying drawing and comprises the features of construction, combination of elements, and arrangements of parts which will be exemplified in the constructions hereinafter set forth and the scope of the application of which will be indicated in the claims.

For a fuller understanding of the nature and objects of the invention, reference should be had to the following detailed description taken in connection with the accompanying drawing, in which:

FIGURE 1 is an exploded view in perspective of the parts, some of which are partially broken away to enable the showing of details of a propeller constructed and arranged in accordance with the teachings of this invention;

FIG. 2 is a top plan view of a portion of the propeller showing the means provided for locking the elements utilized for setting the blade element of the propeller in different angular positions in the hub to change the pitch;

FIG. 3 is a top plan view of the same portion of the propeller as shown in FIG. 2 with the locking member

2 compressed to permit the disengagement of the propeller blade from the hub;

FIG. 4 is a perspective view showing a modification of the means for locking the propeller blade element to the hub; and FIG. 5 is a top plan view of another modification of the locking mechanism with part of the housing removed to show details of the structure.

Referring now to the drawing and FIG. 1 in particular, only a drive shaft 10 is illustrated. It is well known in the art how the drive shaft 10 may be connected to a prime mover such as a motor for a hobby aeroplane or for a motor boat. The size of the shaft will be determined by the duty to be performed and the rating or size of motor.

In this modification of the invention the end portion of the shaft 10 is reduced in diameter as shown at 11 and this portion of reduced diameter is threaded as shown at 12. A washer 13 having an opening of the required size to fit over the threaded portion 12 of the shaft is provided. The washer is of larger diameter than the shaft for a reason that will appear hereinafter. A nut 14 is provided to fit the threaded end of the shaft 10.

As illustrated in FIG. 1, the propeller blade section shown generally at 16 comprises a blade section 17 shaped generally to conform to the blade of a hobby aeroplane which is well known in this art. When the propeller blade section 17 is to be employed with other devices as for example, motor boat engines, the propeller blade section will be designed in accordance with the practice in that art. The inner or butt end of the blade 17 has a neck or shank 18 provided thereon for a purpose that will appear hereinafter. On the inner end of the neck or shank, a boss 19 which will later be described in detail, is provided.

When the hub shown generally at 15 is assembled and mounted on the shaft 10 the washer 13 and nut 14 are utilized for clamping the hub 15 in a fixed position to transmit power. However, any other well known device for fixing a hub on a drive shaft to transmit power may be employed. The present washer 13 and nut 14 for mounting the hub are shown and described in this application since they are well adapted for dismantling and reassembling where such devices will be most commonly employed.

The boss 19 is shaped generally to conform to the shape of the frustum of a cone. The purpose of making the boss of such shape will be referred to hereinafter and is only a preferred form. Innumerable other shapes of bosses may be employed.

In this particular embodiment of the invention, raised members or ridges 20 are formed on the surface of the boss. As shown in FIG. 1 these ridges 20 which may also be referred to as teeth are higher and wider at the end remote from the shank than at the shank or neck end. This results from the shape of the boss.

The hub 15 in this particular embodiment of the invention is made in two parts. The upper part or half 21 is substantially similar to the lower part or half 22 except that it is reversed in position.

As shown in FIG. 1, the end part of the lower hub section 22 has a portion cut out to form half of a housing 28 for the boss 19 provided on the propeller blade and shown generally at 16. This cavity forming half of the housing 28 in the lower section of the hub 22 is substantially the reverse of a conic frustum and is shaped and sized to receive half of the boss 10. Further, it has ridges or teeth 25 provided therein which are designed to intermesh with the ridges or teeth 20 provided on the boss 19.

Further, the end wall enclosing the lower half of the housing has a semi-circular bearing 7 cut therein which together with a corresponding semi-circular bearing surface in the section 21 of the hub presents an opening 27 leading from the housing in which the shank 18 slides. Thus the shank is located centrally of the hub in bearing 7 when it is assembled.

Further, a chamber 23 is provided at the end of the housing 28 to receive a spring member such as the leaf spring 24 which cooperates to hold the boss 19 shaped like a conic frustum and its teeth or raised members in position in the housing 28 in intermeshing relationship with the teeth 25 in the housing. The wall of the opening 27 which leads from the housing 28 provides a bearing 7 for the hank 18 and permits it to slide back and forth carrying the boss 19 into and out of the housing 28 to disengage the teeth 20 on the boss 19 from the teeth 25 in housing 28.

In assembling the hub, the propeller blade 16 is placed with the boss 19 seated in the housing section 28 as shown at the left end of the hub section 22 in FIG. 1. When the propeller blades at opposite ends of the hub are placed in position in the housings, the top section 21 of the hub is placed in position on the lower half 22 with the shaft 10 extending through the opening 8 which extends through both sections 21 and 22. The screw bolts 26 are then placed in the openings 6 and the threaded portion of the screw bolts are engaged with the threads 30 in the lower half 22 of the hub section. As shown the screw bolts 26 are countersunk in the openings 6 so that when they are driven home the washer 14 may be placed on the top section of the hub in full engagement throughout its entire undersurface area. When the nut 14 is mounted on the threaded portion of the end of the shaft 10 and tightened, the hub is firmly clamped in position on the driving shaft 10 ready to transmit power.

When the propeller blade is in position in the housing as shown in FIG. 1 at the left side, the spring 24 holds the teeth 25 provided in the housing and the teeth 20 on the boss in mesh or engagement. In such manner the blade 17 is locked in a predetermined angular position in the hub.

When the hub has been assembled with the propeller blades 16 in a predetermined angular position giving the blades 17 the required pitch, the spring 24 will stand in the position shown in FIG. 2 holding the boss teeth and the housing teeth in mesh thus locking the blades 17 in the position in which they have been set. When it is desired to change the pitch of the propeller blade 17 a manual force is applied axially to the propeller blade 17 forcing it inwardly, the shank 18 sliding in the neck opening 27. In this manner, the spring 24 is compressed as shown in FIG. 3 and the teeth 20 on the boss are carried out of engagement with the teeth 9 in the housing. In this position, the propeller blade may be rotated to rotate the boss in the housing. In this manner, the shaft may be rotated to any desired angular position and when released the teeth 20 on the boss will be forced to mesh with the teeth 25 in the housing. In this manner, the pitch or angular position of the propeller blade may be changed as desired. The angle of change can be controlled by the design and spacing of the teeth.

The modification of the mechanism provided for locking the propeller blade sections in the positions in which it may be set to change pitch shown in FIG. 4, comprises a boss which has an opening 30 drilled axially therein as shown. The opening 30 will be large enough to receive the coil spring 31. The portion of the spring 31 which does not fit into the opening 30 in the boss will, when the mechanism is assembled in the housing, extend into the chamber 23 at the end of the housing as shown in FIG. 1. The operation will be the same as for the spring 24. When the spring 30 is compressed the teeth 20 on the boss 19 will be disengaged from the teeth 25 in the housing 28 and the propeller 17 may be rotated to give it a predetermined pitch. When released the spring 30 will push the teeth 20 on the boss 19 into intermeshing relationship with the teeth 25 in the housing 28. The spring 30 will be made strong enough to, in effect, lock the teeth in mesh for the power applied and the strength of the propeller blade 17.

In the modification shown in FIG. 5, the spring 29 is disposed outside of the housing between the end of the blade section 17 and the housing 22 but the operation will be much the same. When the blade 17 is moved axially the spring 29 will be compressed and the boss 19 forced into the chamber 23 at the end of the housing 22. In this manner, the teeth on the boss and in the housing are disengaged and the pitch of the propeller may be set as desired. As soon as the manual pressure applied to the propeller blade section 17 is released or withdrawn, the spring 29 will force the teeth on the boss 19 and in the housing 22 into meshing engagement and the propeller blade is locked in a predetermined angular position giving it a predetermined pitch.

It was stated in the body of the specification that the reason for making the boss the shape of a conic frustum would be explained. It will be observed in reference to FIG. 1 that when the blade 17 on the left portion of the figure is forced inwardly along the axis to disengage the teeth on the boss 19 and in the housing 22 that the boss 19 has to be moved only a short distance. A movement a distance equal to the height of the ridges 25 will effect a disengagement between the teeth 20 on the boss and the teeth 25 in the housing. This permits the making of the housing and the chamber 23 at the end of the housing much smaller than if the boss was made the shape of a standard gear and the teeth in the housing designed to receive similar gear teeth. In that case it would be necessary to move the boss 19 the length of the gear.

It is not difficult to find a suitable material for making both the hub and propeller blade. In the hobby aeroplane art plastics have been employed. Metals that are light and readily cast are also suitable. Aluminum has also been employed.

Now it has been found in practice that one of the most satisfactory materials for making the hub and propeller blade is nylon. It can be cast and machine worked as desired. It has adequate strength. The cost of nylon is also in a satisfactory range.

Since certain changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. In a propeller for motor propelled devices provided with a drive shaft, in combination, a hub for mounting on the drive shaft, a propeller blade for mounting in the hub for sliding movement axially, said propeller blade comprising a blade section and a hub engaging section, means carried by the hub for receiving and positively engaging the hub engaging section provided in combination with the blade, the hub engaging section provided in combination with the blade being a boss shaped to simulate the frustum of a cone and is provided with ridges simulating gear teeth which extend generally in line with the axis of the boss and the housing formed in the hub being a casing shaped to receive the boss which simulates the frustum of a cone and is provided with inwardly extending ridges simulating gear teeth extending generally in line with the axis of the housing and are complementary to the ridges on the boss with which they intermesh, the intermeshing ridges on the boss and in the housing being of a size to enable the setting of the blade in any number of angular positions manually to regulate the pitch to meet operating conditions, and a chamber carried by the housing and disposed in alignment with the boss for receiving the boss when it is moved axially a distance slightly greater than the depth of the ridges provided on the boss and in the housing to carry them out of meshing relationship to provide for the setting of the propeller blade in different angular positions to change the pitch of the blade, and biasing means disposed in cooperative relationship with the boss for biasing the ridges on the boss and in the housing toward meshing relationship and locking them in mesh when released from the setting pressure.

2. In a propeller for motor driven devices as claimed in claim 1 in which the raised members on the boss and the inwardly extending members in the housing are a plurality of teeth which may be moved into and out of intermeshing relationship an the biasing means is a spring member disposed in the chamber and which functions to lock the teeth in intermeshing relationship in a plurality of different angular positions and which may be compressed to release the intermeshing teeth to permit the rotation of the blade and the setting of it in any number of predetermined angular positions to change the pitch and pulling power of the blade.

3. In a propeller for motor driven devices as claimed in claim 2 wherein the housing provided in the hub has an opening extending therefrom the wall of which forms a bearing in which the shank slides, the chamber provided in housing being shaped and disposed to receive the boss when it is moved axially, the ridges provided on the boss and in the housing being intermeshing teeth extending in the same direction as the axis of the shank whereby they may be moved into and out of intermeshing relationship as the shank is moved axially, the spring member being disposed in the chamber and to cooperate with the boss to lock the teeth in intermeshing relationship to lock the propeller blade in a plurality of predetermined angular positions and compressible whereby the teeth may be disengaged by axial pressure applied to the blade to move the boss into the chamber to provide for setting the blade in different angular positions to change the pitch of the blade and its pulling power.

References Cited

UNITED STATES PATENTS

| | | | |
|---|---|---|---|
| 1,457,125 | 5/1923 | Rosine | 170—160.59 |
| 1,485,552 | 3/1924 | Colby | 170—160.59 |
| 1,634,330 | 7/1927 | Malm | 170—160.61 |
| 2,563,020 | 8/1951 | Gemeinhardt | 170—160.61 |
| 3,174,553 | 3/1965 | Spears | 170—160.59 |

FOREIGN PATENTS 1,189,060   3/1959   France.

EVERETTE A. POWELL, Jr., *Primary Examiner.*

U.S. Cl. X.R.

170—160.11